Nov. 15, 1966 A. B. COZART 3,286,245
CONTROL APPARATUS
Filed Dec. 16, 1963
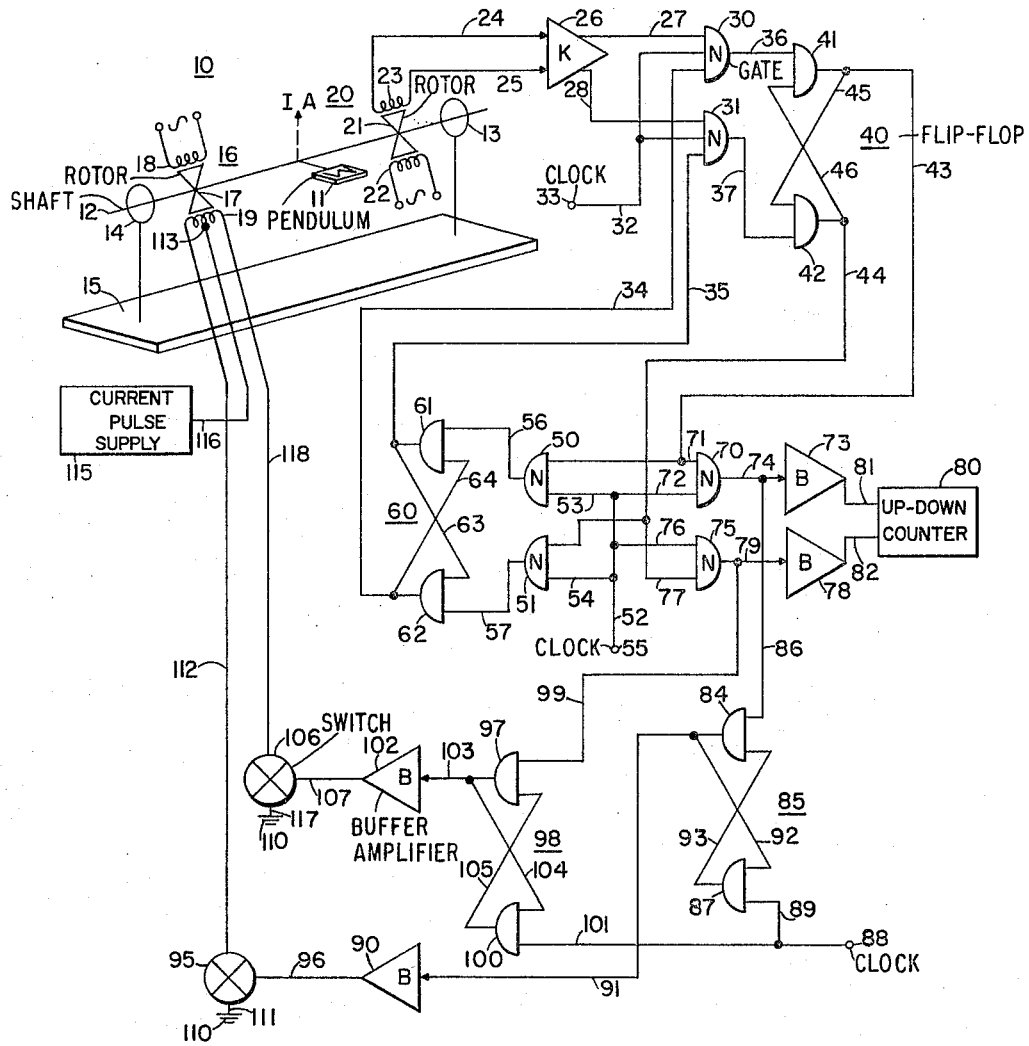
INVENTOR.
ARON B. COZART
BY Roger W. Jensen
ATTORNEY

United States Patent Office 3,286,245
Patented Nov. 15, 1966

3,286,245
CONTROL APPARATUS
Aron B. Cozart, Clearwater, Fla., assignor to Honeywell Inc., a corporation of Delaware
Filed Dec. 16, 1963, Ser. No. 331,053
5 Claims. (Cl. 340—187)

This invention relates to apparatus for rebalancing an inertial sensor and more specifically to apparatus for digitally rebalancing an inertial sensor while providing a digital signal indicative of a force applied thereto.

Prior art digital rebalance systems are generally classified under one of two major categories. The two major types of prior art digital rebalance systems are the "plus-minus" system and the "pulse on demand" system. In general, either of the digital rebalance systems operate in the following fashion. An input condition, which may be a movement or an acceleration, is applied to an inertial sensor. The inertial sensor can be either a gyroscope or an accelerometer having a member which moves in response to an input which it is desired to sense. The inertial sensor also has connected thereto a signal generator which provides a signal indicative of the movement of the aforementioned member and a rebalance device which when properly energized provides a force on the movable member. A source of substantially constant energy current pulses is utilized for the energization source. Switching apparatus is then utilized to connect the current pulses to the force generator in an orientation to provide a force which substantially counteracts the input condition. The switching apparatus also provides an indication of the force applied to the member.

It should be noted that the basic difference between the "plus-minus" rebalance system and the "pulse on demand" rebalance system lies in the switching apparatus. In the "plus-minus" rebalance system the switching apparatus operates at points called the threshold. For purposes of this discussion the threshold may be defined as an arbitrary amount of movement of the movable member in the inertial sensor beyond which the direction of the force applied to the movable member by the force generator or rebalance device is reversed. That is, there is a positive threshold and a negative threshold for movement of the member from a null position. The switching apparatus applies the current pulses to the force generator in a first polarity until the movable member passes the positive threshold. At this time the switching apparatus is energized and the current pulses are applied to the force generator in the opposite polarity until the movable member passes the negative threshold. It should be noted that pulses are applied in a given polarity until one of the thresholds is passed, at which time the polarity is reversed. In the ideal "plus-minus" system, with no input to the inertial sensor, the switching apparatus is so constructed that the pulses alternate in polarity. That is, a positive pulse drives the movable member past the positive threshold and the switching apparatus is energized. A negative pulse is then applied which drives the movable member past the negative threshold. The pulses continue to alternate in this fashion until an input is applied to the inertial sensor.

There is a major problem in the "plus-minus" rebalance system which occurs when the movable member is exactly at the null position. It must be remembered that in the ideal "plus-minus" rebalance system one pulse contains sufficient energy to cause the force generator to drive the movable member from one threshold through null to the other threshold. Thus, when the movable member is at the null position a positive current pulse drives the movable member a large distance past the positive threshold. The switching apparatus is energized and a negative pulse is then applied to the force generator. However, the negative pulse is only sufficient to drive the movable member back to the null position. The switching apparatus is not energized, since the opposite threshold was not passed, and a second negative pulse is applied which causes the force generator to drive the movable member far past the negative threshold. Thus, instead of having every pulse an alternate pulse the system has every other pulse as an alternate pulse. This can greatly decrease the sensitivity of the system. Also, since the current pulses must contain a large quantity of energy to cause the force generator to drive the movable member the distance it must travel for one pulse, the frequency of the system is greatly limited. This can be seen by noting that the width of the current pulses must necessarily decrease with an increase of frequency.

In the "pulse on demand" rebalance system the switching apparatus is simply energized whenever the movable member of the inertial sensor is not at the null position. The energization source of the switching apparatus must be such as to cause the switching apparatus to connect the proper amount and polarity of current pulses to the force generator to return the movable member to the null position. When the movable member is at the null position no pulses are applied to the force generator. When the pulses are not being applied to the force generator they are applied to an impedance called a dummy load, which simply absorbs the energy. The great disadvantages in this system are the extra components needed to provide a dummy load for the current pulse source, pendulum hangoff proportional to acceleration input as in analog systems, and the difference of heating of the inertial sensor, since current is flowing through the force generator only part of the time. The uneven heating mentioned above causes changes in bias and damping.

The present invention is a rebalance system for a condition responsive device such as an inertial sensor which has the capabilities of high frequency performance as well as extremely good resolution and uniform heating with minimum pendulum hangoff to introduce vibropendulous errors. The condition responsive means has a movable member which moves in either direction from a null position in response to a given condition. An example of such a device is a pendulous accelerometer. The condition responsive means also has a signal generator which provides an output signal indicative of the movement of the movable member. Rebalance means, which may be a force generator, are attached to the condition responsive means and when properly energized produce a force on the movable member. Switching apparatus connects a substantially constant energy current pulse source to the rebalance means in the proper orientation upon receiving a proper input. And when no input is applied to the switching means the direction in which the current pulses flow through the rebalance means is continually switched. Thus, alternate polarity pulses of current flow through the rebalance means continually with no input to the switching means.

To accomplish the above stated design positive and negative thresholds are set up for movement of the movable member. In the present invention these thresholds are set at the minimum movement detectable by the signal generator. The movable member is allowed to travel at random between the two thresholds and the switching means simply applies alternate positive and negative pulses to the rebalance means. However, once a given condition or input is applied to the condition responsive means which drives the movable member past a threshold the signal generator provides a signal which is applied to the switching means. The switching means applies a sufficient number of pulses in a given direction to force the movable member back within the thresholds. The switching means also provides two sets of pulses, equivalent to positive and negative current pulses passing through the rebalance means, which are applied to an output device, such as an up-down counter. The up-down counter provides an indication, which may be an electrical signal, if a plurality of one of the sets of pulses is applied in a given time. This plurality of pulses is an indication of the condition which the condition responsive means is sensing.

The present invention has the advantage that all of the pulses pass through the rebalance means providing constant heating and the current pulses can be made as small or as large as desired, depending upon the resolution and condition measuring capabilities of the system. Therefore, very high frequencies can be utilized and extremely good resolution can be obtained.

It is a primary object of this invention to provide an improved control apparatus.

It is a further object of this invention to provide a new and improved rebalance system.

These and other objects of this invention will become apparent from the following description of a preferred form thereof in the accompanying specification, claims, and drawings of which:

The figure is a block diagram of the present apparatus.

In the figure the numeral 10 generally designates a condition responsive means, which in this example is a pendulous accelerometer. The pendulous accelerometer 10 has a pendulum 11 fixedly attached to a shaft 12. Shaft 12 is mounted for rotation about its longitudinal axis by bearing means 13 and 14 which are in turn fixedly mounted to a base means 15. The acceleration sensitive or input axis of the pendulous accelerometer 10 is denoted by a dotted line marked IA which is mutually perpendicular to shaft 12 and pendulum 11. A force generator, which in this embodiment is a torque generator, is identified by the numeral 16. Torque generator 16 has a rotor 17 which is fixedly attached to the shaft 12 and rotates therewith. A pattern field winding 18 is adapted to have applied thereto a sinusoidal voltage for excitation of the torque generator 16. A control field winding 19, when properly energized, provides the additional excitation necessary for the torque generator 16 to produce torque on shaft 12.

A signal generator which provides an electrical signal indicative of the rotation of shaft 12 is generally indicated by the numeral 20. Signal generator 20 has a rotor 21 fixedly attached to shaft 12 for rotation therewith. An excitation winding 22 is adapted to have applied thereto a proper energization voltage. An output winding 23 has a voltage thereon with a frequency the same as the frequency of the excitation voltage on winding 22 but modulated as a function of the movement of rotor 21. This voltage is applied to an amplifier 26 by means of a pair of leads 24 and 25. Any of a variety of phase splitting amplifiers could be used in the block designated 26 as long as the outputs are 180° out of phase. It should be understood that if high quadrature is present in the signal generator output a demodulator and filter might be necessary. However, this embodiment of the present invention was chosen since this is the simplest type of mechanization.

Amplifier 26 has two outputs, which are 180° out of phase, on a pair of leads 27 and 28. Lead 27 is connected to an input of nand gate 30 and lead 28 is connected to an input of a second nand gate 31. A lead 32 provides a second input for each of the nand gates 30 and 31. Lead 32 simply ends in a terminal 33, since the remaining portion of this circuitry is not part of the present invention. However, it should be understood that a series of negative going clock pulses are applied to lead 32 and, thus, to the second inputs of nand gates 30 and 31. Nand gate 30 has a third input on a lead 34 which will be discussed later. Nand gate 31 has a third input on a lead 35 which will be discussed later. All excitation, pulse, and clock pulse frequencies discussed in connection with this embodiment of the invention are synchronous.

In the present embodiment if negative or zero signals are applied to nand gate 30 on all three of the inputs a positive signal will appear at the output on a lead designated 36. Likewise, if all three of the inputs to nand gate 31 are negative or zero a positive signal will appear at the output on a lead designated 37. However, if any one of the inputs to either of the nand gates 30 or 31 is positive that nand gate will be inhibited and no signal will appear at the output. Also, it should be noted that the signals on leads 27 and 28 are 180° out of phase and, thus, when the signal on lead 27 is negative the signal on lead 28 will be positive and nand gate 31 will be inhibited. Likewise, when the signal on lead 28 is negative the signal on lead 27 will be positive and nand gate 30 will be inhibited. The peak of the signals on leads 27 and 28 should be phased to occur at the same time as the clock pulse at terminal 33.

Lead 36 is connected to an input of a first stage 41 of a flip-flop 40. Lead 37 is connected to an input of a second stage 42 of flip-flop 40. The output of the first stage 41 of flip-flop 40 appears on a lead 43. The output of the second stage 42 of flip-flop 40 appears on a lead 44. The output of the first stage 41 is also connected to an input of the second stage 42 by means of a lead 45. The output of the second stage 42 is connected to an input of the first stage 41 by means of a lead 46. The operation of the flip-flop 40 is such that a positive signal on either one of the inputs at lead 36 or 37 causes that stage to produce a negative output. Thus, a positive signal on lead 36 causes stage 41 to provide a negative level on lead 43 while stage 42 provides a positive level on lead 44. If the flip-flop is already in this state it will remain there. However, if it is in the opposite state it will change states to provide these outputs. It should be noted that the circuit would also operate if the flip-flop were such that a positive signal on one of the stages would provide a positive signal from that stage or conversely that a negative signal at the input produced either negative or positive signals at the outputs.

Lead 43 is connected to an input of a nand gate 50. Lead 44 is connected to an input of a nand gate 51. Nand gates 50 and 51 operate in a fashion similar to that of nand gates 30 and 31. A lead 52 is connected to a second input of nand gate 50 by means of a lead 53. Lead 52 is also connected to a second input of nand gate 51 by means of a lead 54. Lead 52 is connected to a source of negative going clock pulses, not shown, which are slightly delayed from the pulses at terminal 33. Since this source of pulses is not part of the present invention lead 52 is simply illustrated as terminating in a terminal 55.

The output of nand gate 50 is applied to a first stage 61 of a flip-flop 60 by means of a lead 56. The output of nand gate 51 is applied to an input of a second stage 62 of flip-flop 60 by means of a lead 57. Lead 34, previously mentioned, is connected to the output of the second stage 62 of flip-flop 60. Lead 35, previously mentioned, is connected to the output of the first stage 61 of flip-flop 60. The output of the first stage 61 is connected to an input of the second stage 62 by means of a lead 63. The output of the second stage 62 is connected to an input of the first stage 61 by means of a lead 64. Flip-flop 60 operates in a fashion similar to that described for flip-flop 40.

One input of a nand gate 70 is connected to lead 43 by means of a lead 71. A second input of nand gate 70 is connected to lead 52 by means of a lead 72. The output of nand gate 70 is connected to the input of a buffer amplifier 73 by means of a lead 74. Nand gate 70 operates in a fashion similar to that of nand gate 30. One input of a nand gate 75 is connected to lead 52 by means of a lead 76. A second input of nand gate 75 is connected to lead 44 by means of a lead 77. The output of nand gate 75 is connected to the input of a buffer amplifier 78 by means of a lead 79. The operation of nand gate 75 is similar to that of nand gate 30. The output of buffer amplifier 73 is connected to an input of an up-down counter 80 by means of a lead 81. The output of buffer amplifier 78 is connected to a second input of the up-down counter 80 by means of a lead 82. Each time a positive pulse is applied to the up-down counter 80 on lead 81 the counter counts up one. Each time a positive pulse is applied to the up-down counter 80 on lead 82 the counter counts down one. Thus, an excess of pulses for a given period of time on either lead 81 or lead 82 will be indicated by up-down counter 80. The indication, or the output, of up-down counter 80 may be either electrical or visual, depending upon the application, and is not shown here since it is not part of the invention.

An input to a first stage 84 of a flip-flop 85 is connected to lead 74 by means of a lead 86. An input to a second stage 87 of flip-flop 85 is connected to a terminal 88 by means of a lead 89. Terminal 88 is connected to a source of positive clock pulses which are delayed a predetermined amount from the pulses prevalent on terminal 55. The output of the first stage 84 is connected to the input of a buffer amplifier 90 by means of a lead 91. The output of the first stage 84 is also connected to an input of the second stage 87 by means of a lead 92. The output of the second stage 87 is connected to an input of the first stage 84 by means of a lead 93. Flip-flop 85 operates in a manner similar to that of flip-flop 40.

Whenever a positive signal appears at lead 86 flip-flop 85 changes states so that the first stage 84 provides a negative signal on lead 91. The negative signal on lead 91 is amplified and inverted by buffer amplifier 90 and applied to the control element of a switch 95 by means of a lead 96. The positive signal appiled to the control element of switch 95 causes the switch to close so that current may flow therethrough. After the positive signal pulse is gone from lead 86 a positive clock pulse, known as a reset pulse, appears at terminal 88 and is applied to the input of the second stage 87 of flip-flop 85. The positive pulse on the second stage 87 causes flip-flop 85 to change states and a positive signal appears on lead 91 which is amplified and inverted by amplifier 90. The switch 95 will only allow current therethrough while a positive signal level is being applied thereto. Thus, when flip-flop 85 changes state switch 95 stops conducting.

An input to a first stage 97 of a flip-flop 98 is connected to lead 79 by a lead 99. A second stage 100 of flip-flop 98 has the reset pulses prevalent on terminal 88 applied thereto by means of a lead 101. The output of the first stage 97 is applied to a buffer amplifier 102 by means of a lead 103. The output of the first stage 97 is also applied to an input of the second stage 100 by means of a lead 104. The output of the second stage 100 is applied to an input of the first stage 97 by means of a lead 105. Flip-flop 98 operates in a fashion similar to that of flip-flop 40.

Whenever a positive signal appears on lead 99 the first stage 97 of flip-flop 98 produces a negative level on lead 103 which is amplified and inverted by buffer amplifier 102. The positive level is then applied to the control element of a switch 106 by means of a lead 107. A positive level on the control element of switch 106 causes that switch to be closed and conduct current therethrough for the duration of the level. After the positive pulse is no longer on lead 99 a positive reset pulse appears on lead 101. This positive pulse causes flip-flop 98 to change states. Stage 97 then produces a positive level which upon being amplified and inverted causes switch 106 to stop conducting.

One side of switch 95 is connected to ground 110 by means of a lead 111. The other side of switch 95 is connected to one side of the control winding 19 of torque generator 16 by means of a lead 112. The control winding 19 of torque generator 16 has a center tap 113. Center tap 113 is connected to a current pulse supply 115 by means of a lead 116. It should be noted that the system would operate if the control winding was not center tapped and a different switching arrangement were used for the current pulse source. The present embodiment is utilized because of its simplicity. When a positive pulse appears on lead 96 switch 95 is closed and allows a current pulse to flow from the current pulse supply 115, through one-half of the control winding 19, along lead 112 to switch 95 and then to ground 110. One side of switch 106 is connected to ground 110 by means of a lead 117. The other side of switch 106 is connected to the opposite side of control winding 19 by means of a lead 118. When a positive pulse appears on lead 107 switch 106 is closed and allows a current pulse to flow from the current pulse supply 115 through the other half of the control winding 19, along lead 118 to switch 106 and then to ground 110. Since the current pulses flow through the control winding in different directions from the center tap 113 they produce oppositely directed torques on the rotor 17. It should be noted that the timing of the present system is such that one current pulse is allowed to flow through the control winding 19 each time one of the switches 95 or 106 close.

In the operation of the present device the signal generator 20 only provides a useful signal on leads 24 and 25 when the pendulum 11 moves from the null position a given amount. This amount of movement is known as the threshold. As long as the pendulum 11 remains at the null position or within the thresholds, substantially no signal appears on leads 24 and 25 and, therefore, no signals appear on leads 27 and 28 at the output of the amplifier 26. If it is assumed that the flip-flop 60 is in such a state as to provide a negative signal on lead 35 and a positive signal on lead 34, nand gate 31 will conduct when a negative signal appears at terminal 33 from the clock source. When nand gate 31 conducts a positive pulse appears on lead 37 which causes flip-flop 40 to provide a negative level on lead 44 and a positive level on lead 43. The positive level on lead 43 inhibits both nand gates 50 and 70. The negative level on lead 44 is applied to the inputs of both nand gates 51 and 75. When a negative pulse appears at terminal 55 both of the nand gates 51 and 75 conduct and provide positive pulses on leads 57 and 79 respectively. The positive pulse on lead 79 is amplified by the buffer material 78. The positive pulse is then applied to the up-down counter 80 and causes it to count down one. Simultaneously, the positive pulse on lead 57 causes flip-flop 60 to change to the state which provides a negative level on lead 34 and a positive level on lead 35. Thus, nand gate 31 will now be inhibited and nand gate 30 will conduct when the next negative clock pulse appears at terminal 33.

When nand gate 30 conducts a positive pulse appears on lead 36 and causes flip-flop 40 to change states providing a negative level on lead 43 and a positive level on lead 44. The positive level on lead 44 inhibits nand gates 51 and 75. The negative level on lead 43 is applied to nand gates 50 and 70 which will conduct upon receiving the negative pulse from terminal 55. Nand gate 70 provides a positive pulse which is amplified by buffer amplifier 73. The positive pulse is then applied to the up-down counter 80 which counts up one. The positive pulse on lead 56 causes flip-flop 60 to change states thereby providing a positive level on lead 34 and a negative level on lead 35 and the cycle just explained is continued. Thus, as long as the pendulum 11 is at the null position, or within the thresholds so that no signal is applied to amplifier 26 the logic circuitry continues to provide alternate pulses to the up-down counter. These alternate pulses cause the up-down counter to indicate a net count of zero or no acceleration.

As the positive pulses alternately appear on the leads 74 and 79, they are applied to flip-flops 85 and 98, respectively, and switches 95 and 106 are alternately closed to allow pulses of current to pass through opposite halves of the control winding 19 of the torque generator 16.

Thus, as the up-down counter 80 has alternate pulses applied thereto, the torque generator 16 has alternate pulses applied thereto causing the pendulum 11 to oscillate between the threshold points.

When an acceleration appears along the IA moving the pendulum 11 from its null position a sufficient amount to cause signal generator 20 to produce a signal on leads 24 and 25, amplifier 26 will provide signals on leads 27 and 28 180° out of phase. For this example it is assumed that the pendulum 11 moves in a downward direction and a positive signal appears on lead 27 while a negative signal appears on lead 28. The positive signal on lead 27 inhibits nand gate 30. If it is also assumed that a negative signal is prevelant on lead 35, the nand gate 31 will conduct when the clock pulse appears at terminal 33. Once the nand gate 31 conducts a positive signal is applied to the second stage 42 of flip-flop 40 and a negative level is produced on lead 44 while a positive level is produced on lead 43. The positive level on lead 43 inhibits nand gates 50 and 70. When a negative pulse appears at terminal 55 both inputs to nand gates 51 and 75 are negative and they both conduct providing positive signals on leads 57 and 79. The positive signal on lead 79 causes the up-down counter 80 to count down one while flip-flop 98 provides a signal which closes switch 106 thereby applying a pulse of current to one-half of the control winding 19 of torque generator 16. Simultaneously, the positive pulse on lead 57 causes flip-flop 60 to change states and a negative level will appear on lead 34 while a positive level appears at lead 35. If the torque generator 16 was not energized sufficiently to cause the pendulum 11 to be forced back within the threshold, the signal on lead 27 will still be positive while the signal on lead 28 will still be negative. Since the nand gate 30 is still inhibited and the nand gate 31 is also inhibited by the positive level on lead 35, flip-flops 40 and 60 will remain in their present state. Since nand gates 51 and 75 conduct each time a pulse appears at terminal 55, positive pulses will be applied to counter 80 on lead 82 until the pendulum 11 returns within the threshold limits and the positive signal on lead 27 disappears. Thus, the up-down counter 80 will have a plurality of down pulses indicated thereon and the torque generator 16 will have torqued the pendulum 11 a plurality of pulses upward or toward the null position.

Assume the acceleration along the IA axis is reversed so that the pendulum swings through the null position and the other threshold. Now the signal generator provides a signal which, when applied to the amplifier 26, causes a negative signal on lead 27 and a positive signal on lead 28. Nand gate 31 is inhibited. Since the level on lead 34 is negative, nand gate 30 conducts when a pulse appears at terminal 33. Thus flip-flop 40 changes to the state in which a negative level is prevalent on lead 43 while a positive level is prevalent on lead 44. Nand gates 51 and 75 are inhibited and nand gates 50 and 70 will conduct when a negative pulse appears at the terminal 55. Thus, up-down counter 80 counts up one while the positive signal on lead 56 causes flip-flop 60 to change into the opposite state. Lead 35 now has a negative level thereon while a positive level appears on lead 34 and nand gate 30 is inhibited. Simultaneously a pulse of current is allowed to pass through one-half of the control field winding 19 by the closing of switch 95. If this pulse of current is not sufficient to cause the torque generator 16 to drive the pendulum 11 back within the thresholds, the signals from the amplifier 26 remain at the same polarity. Thus, nand gates 30 and 31 are both inhibited and flip-flops 40 and 60 remain in their present state. Each time a negative pulse appears at terminal 55 nand gates 50 and 70 conduct. The conduction of nand gate 70 provides positive pulses at up-down counter 80 which cause that counter to count up one for each pulse. These positive pulses also cause switch 95 to close for the duration thereof allowing current pulses to flow through one-half of the control field winding 19.

Once a sufficient number of current pulses are applied to the control field winding 19 to cause the torque generator 16 to drive the pendulum 11 within the thresholds, the signals on leads 27 and 28 disappear. Since there is no longer a positive signal on lead 28 nand gate 31 is free to conduct whenever a negative signal appears at terminal 33. Once this negative signal appears flip-flops 40 and 60 change into the opposite states and the pulses to the up-down counter begin to alternate again. The closing of switches 95 and 106 alternate also to cause the torquer 16 to be energized in alternate directions, thereby causing pendulum 11 to oscillate between the thresholds until some force causes it to cross over a threshold at which time the circuitry again provides current pulses all in one direction.

Thus, whenever the pendulum 11 is within the thresholds, or approximately at the null position, the signal produced by the signal generator 20 is insufficient for the amplifier 26 to provide signals on leads 27 and 28. When there are no signals on the leads 27 and 28 the logic circuitry continually provides alternate pulses to the up-down counter 80 and also causes pulses of current to pass through the control winding 19 of the torque generator 16 in opposite directions (opposite halves of winding 19) thereby causing alternate torquing steps. Whenever the pendulum 11 moves past one of the thresholds a signal is applied to the amplifier 26 sufficient to produce voltages on leads 27 and 28 which are 180° out of phase and the logic circuitry causes the up-down counter 80 to count in one direction only. Simultaneously pulses of current are applied to the control winding 19 of the torque generator 16 to torque the pendulum 11 back toward its null position.

The frequency of the pulses in the present invention is only limited by the particular components used in the circuitry. Thus, if a very good resolution is desired a very high frequency may be utilized. Another great advantage of the present invention is that the pendulum 11 does not need to travel past the thresholds to cause the input to the up-down counter 80 to alternate. This is a major advantage and adds to the accuracy of the system since no pulses are lost, as they are in the prior art systems, if the pendulum should be at null when the system is started.

While I have shown and described a preferred embodiment of this invention, the invention should not be limited to the particular form shown, and I intend in the appended claims to cover all modifications which do not depart from the spirit and scope of the invention.

What is claimed is:

1. A rebalance system comprising:
   condition responsive means having a movable member which moves from an initial position in response to a given condition;
   rebalance means connected to said condition responsive means, said rebalance means being operable to move said movable member;
   first signal generating means connected to said condition responsive means for providing a signal indicative of movement of said movable member from its initial position;
   second signal generating means connected to said first signal generating means for receiving said signal from said first signal generating means, said second signal generating means providing first pulses when said signal exceeds a first magnitude, second pulses when said signal is less than a second magnitude, and alternate first and second pulses when said signal is between said first and second magnitudes;
   signal supplying means connected to said rebalance means for supplying an energization signal thereto; and
   switching means connected to said second signal generating means for receiving said pulses from said signal generating means and further connected to said rebalance means for completing a first signal path therethrough in response to said first pulses whereby said rebalance means moves said movable member in a first direction, for completing a second signal path therethrough in response to said second pulses whereby said rebalance means moves said movable member in a second direction, and for alternaately completing said first and second signal paths therethrough in response to said alternate first and second pulses.

2. In a rebalance system as defined in claim 1 in combination with output means connected to said second signal generating means for receiving said first and second pulses therefrom, said output means providing an indication of the number of said first and second pulses generated by said second signal generating means.

3. A rebalance system as defined in claim 1 in which said second signal generating means includes:
first bistable means;
first gating means connected to said first signal generating means;
first clock means connected to said first gating means;
second bistable means;
second gating means connected to said first bistable means;
second clock means connected to said second gating means;
means connecting said first gating means to said first bistable means;
means connecting said second gating meaons to said second bistable means;
means connecting said second bistable means to said first gating means whereby said first and second bistable means remain in first states when said signal from said first signal generating means exceeds a first magnitude, remain in second states when said signal from said first signal generating means is less than a second magnitude, and alternate between said first and second states when said signal from said first signal generating means is between said first and second magnitudes; and
means connecting said first bistable means to said switch means for operating said switch means.

4. A rebalance system comprising:
condition responsive means having a movable member which moves from an initial position in response to a given conditon;
rebalance means connected to said condition responsive means for rebalancing said movable member;
signal generating means connected to said condition responsive means for providing a signal indicative of movement of said movable member;
pulse generating means connected to said signal generating means for receiving said signal therefrom, said pulse generating means for providing first pulses when said signal exceeds a first magnitude, second pulses when said signal is less than a second magnitude, and alternate first and second pulses when said signal is between said first and second magnitude;
signal supplying means connected to said rebalance means for supplying an energization signal thereto;
switching means connected to said rebalance means and to said pulse generating means to receive said pulses from said pulse generating means, said switching means completing a first signal path through said rebalance means in response to said first pulses, a second signal path through said rebelance means in response to said second pulses, and alternatively completing said first and second signal paths in response to alternate first and second pulses; and
output means connected to said pulse generating means for receiving said first and second pulses therefrom, said output means providing a signal indicative of the amount of movement of said movable member from its initial position.

5. In a pulse rebalance system for a condition responsive means wherein the condition responsive means includes a movable member which moves from an initial position in response to changes in a given condition;
an error signal producing means which produces an error signal of a first sense when the condition being sensed exceeds a first magnitude, an error signal of a second sense when the condition being sensed is less than a second magnitude, and no useable signal when the condition being sensed is between said first and second magnitudes; and
rebalance means for receiving a pulse signal for returning said movable member to its initial condition the combination with
pulse generating means connected to said error signal producing means for receiving said error signal, said pulse generating means producing first pulses in response to said error signal of a first sense, second pulses in response to said error signal of a second sense, and alternate first and second pulses in reponse to said error signal when the condition being sensed is between said first and second magnitudes; and
means connecting said pulse generating means to said rebalance means whereby said first pulses move said movable member in a first direction and said second pulses move said movable member in a second direction.

References Cited by the Examiner

UNITED STATES PATENTS

| | | | |
|---|---|---|---|
| 2,429,771 | 10/1947 | Roberts | 340—187 |
| 2,729,773 | 1/1956 | Steele | 318—20.30 |
| 2,860,294 | 11/1958 | Steele | 340—187 |
| 2,916,279 | 12/1959 | Stanton | 340—186 |
| 3,097,340 | 7/1963 | Dobbie | 340—187 |

NEIL C. READ, *Primary Examiner.*

THOMAS B. HABECKER, *Examiner.*